United States Patent
Montiel

(10) Patent No.: US 8,691,363 B2
(45) Date of Patent: Apr. 8, 2014

(54) DECORATIVE AND PROTECTIVE NONSLIP COVERING OF MULTIPLE USES AND THE PRODUCTION PROCESS AND COMPOSITION THEREOF

(75) Inventor: Gabriel Lopez Montiel, Naucalpan (MX)

(73) Assignee: PYN, S.A. de C.V., Naucalpan (MX)

( * ) Notice: Subject to any disclaimer, the term of this patent is extended or adjusted under 35 U.S.C. 154(b) by 797 days.

(21) Appl. No.: 11/903,055

(22) Filed: Sep. 20, 2007

(65) Prior Publication Data

US 2009/0029107 A1 Jan. 29, 2009

(30) Foreign Application Priority Data

Jul. 26, 2007 (MX) .................... MX/a/2007/009016

(51) Int. Cl.
*B32B 3/00* (2006.01)
*B32B 3/12* (2006.01)
*B32B 3/26* (2006.01)

(52) U.S. Cl.
USPC ......... 428/141; 428/156; 428/158; 428/304.4

(58) Field of Classification Search
USPC ......... 428/141, 156, 158, 913, 304.4; 521/85, 521/94, 95, 97, 145
See application file for complete search history.

(56) References Cited

U.S. PATENT DOCUMENTS

| 4,237,239 | A | * | 12/1980 | Lilley ............................. 521/134 |
| 4,579,907 | A | | 4/1986 | Wildenau |
| 4,832,896 | A | | 5/1989 | Stockmeyer |
| 4,917,932 | A | * | 4/1990 | McClung ........................ 428/90 |
| 5,637,378 | A | * | 6/1997 | Hensler et al. ................ 428/192 |
| 5,821,274 | A | | 10/1998 | Martin |
| 6,150,444 | A | | 11/2000 | Brodeur, Jr. |
| 6,225,365 | B1 | | 5/2001 | Zerafati et al. |
| 6,444,075 | B1 | | 9/2002 | Schneider et al. |
| 6,822,024 | B1 | | 11/2004 | Spirkowyc et al. |
| 7,041,735 | B2 | | 5/2006 | Saito |
| 2007/0020449 | A1 | * | 1/2007 | Hing .......................... 428/318.4 |

FOREIGN PATENT DOCUMENTS

| EP | 0253146 | 1/1988 |
| JP | 8176384 | 7/1996 |
| JP | 2005/290022 | 10/2005 |
| KR | 95001010120 | 9/1995 |

* cited by examiner

*Primary Examiner* — Catherine A Simone

(57) ABSTRACT

This invention relates to a nonslip decorative and protective coverings in order to cover and protect distinct surfaces, its composition and the manufacturing process thereof; characterized in that it consists of a foamed cellular film based on dry mixed and calendared suspension resins, defining a smooth textured and decorated upper surface, and a rough lower surface with high adherence; said film consists of a composition of: a) suspension resin of vinyl polychloride and/or copolymer of vinyl chloride; b) plasticizers in order to provide flexibility to the covering; c) other components such as elastomers, Barium/Zinc or tin stabilizers; lubricants, biocides, flame retardants, pigments and charges, in order to facilitate the processing thereof, and d) foaming agents.

10 Claims, 1 Drawing Sheet

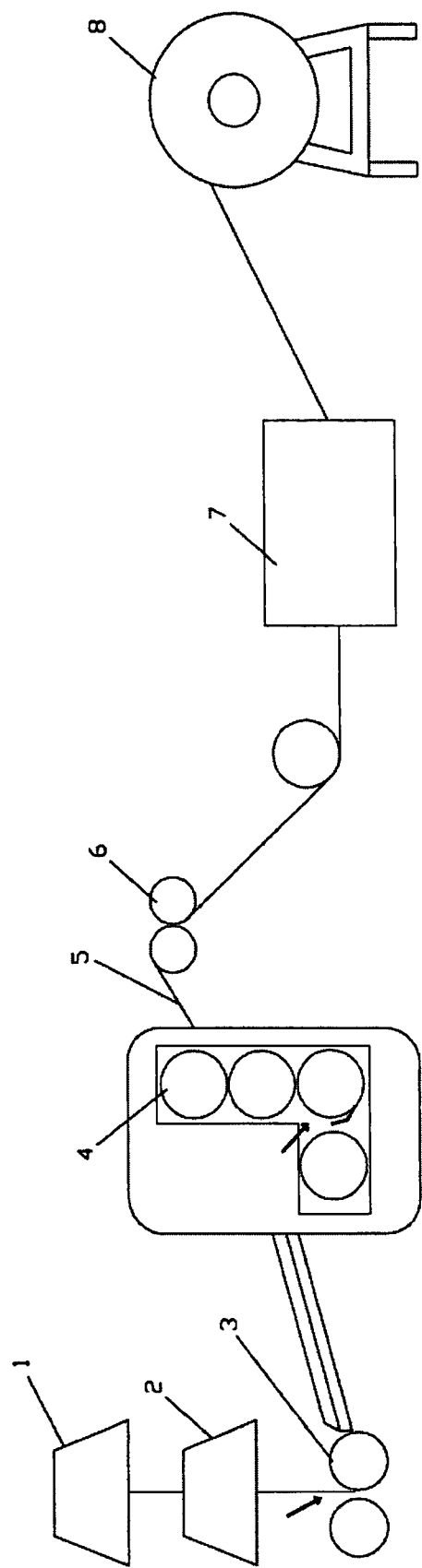

DECORATIVE AND PROTECTIVE NONSLIP COVERING OF MULTIPLE USES AND THE PRODUCTION PROCESS AND COMPOSITION THEREOF

BACKGROUND OF THE INVENTION

1. Field of the Invention

This invention refers to synthetic decorative coverings used to cover and protect distinct surfaces. More specifically it refers to a novel, decorative, nonslip covering in order to cover and protect nonslip surfaces, the composition thereof, and the manufacturing process thereof.

2. Description of the Related Art

There currently exist decorative nonslip surface products on the market which are protective coverings of multiple uses, used to protect and cover flat surfaces of shelves, tables, drawers, etc.

A wide variety of products are employed for the aforementioned uses, such as those described hereunder:

a) Decorative papers, these present low resistance to brakeage and tearing, apart from the fact that they easily slide around the surface where they are placed.

b) Decorative paper with adhesive, which, although it does not slip, has the significant disadvantage of low mechanical resistance and of being permanently fixed to the surface to which it is stuck, meaning that it is unable to be removed.

c) Simple plastic films (PVC and PE). Such products either slip or rise from the surface they are supposed to protect, thereby causing serious inconveniences to the user d) Films foamed with plastisols. Such films damage or stain the surface where they are applied.

e) Textile meshes coated with PVC foam. Such products do provide cushioning and do not slip easily, but they present uneven upper surfaces thus resulting in being unable to place fragile and light objects thereupon, such as cups, glasses, etc.

f) Textile meshes covered with PVC and laminated to a plastic film, where the plastic film attempts to eliminate the disadvantages of the products specified in the above paragraph, but its surface is still not completely flat, in that the uneven surface of the scrim meshes juts out, which gives a disagreeable aspect The coverings described above are structures of various layers and materials which intend to resolve the problem of slipping on smooth surfaces; however the structural composition thereof is complex and requires various layers of material which provide a decorative pattern on the upper face and an irregular surface of good adherence on the lower face. The above results in greater costs in the product and in the process, in that it requires more materials, distinct sorts of materials and distinct phases in the process, etc.

SUMMARY OF THE INVENTION

Given the need to manufacture a decorative covering with a simple structure with the unique element of having nonslip properties on the surfaces whereupon it is placed and which is also economical to produce upon being manufactured with a simple and unique process, this led to the development of the nonslip decorative covering of this invention In order to achieve the nonslip decorative covering of this invention; human, financial and material resources were invested for the research and innovation, which, by means of an innovative process resulting from the need for perfection, given that it deals with industrial processes of high production, managed to decrease the process times, increasing productivity, added to an increase in operation and process speeds, resulting in a significant reduction in costs.

Briefly, a new and improved nonslip decorative and protective covering of multiple uses, is provided in accordance with this invention, composed of a foamed cellular film based on dry mixed and calendared suspension resins, defining a smooth textured and decorated upper surface, and a rough lower surface with high adherence that avoids slippage on the surfaces where it is placed. The foamed film is of the following composition: a) Suspension resin of vinyl polychloride and/or copolymer of vinyl chloride; b) Plasticizers in order to provide flexibility to the covering, of the group of phthalates and/or phosphates and/or benzoates and/or some other mixture of plasticizers—the plasticizers are added at an amount of between 10 and 100 parts per one hundred parts of resin; c) other components such as elastomers, Barium/Zinc or tin stabilizers; lubricants, biocides, flame retardants, pigments, charges and any other additive in order to facilitate the processing thereof; and d) foaming agents such as azodicarbonamide and derivatives thereof, expandable hydrazines and/or microspheres of acrylic polymers, nitrile-acryl, styrene, PVDC, and with butane or pentane gas or another liquid, the amount may vary from between 1 and 10 parts per one hundred parts or resin.

The present invention also provides a process consisting of the following steps: a) feed and homogenize the components as described above in an intensive high speed mixer until a dry mixture is obtained; b) feed the dry mixture into mixers until plasticized; c) form the decorative film in a 4 to 5-roller calender; d) texture the obtained film with engraving rollers; and e) print the textured film onto the upper surface with offset printing, serigraphy or rotogravure with different designs and colors.

The main objective of this invention is to make available a decorative and protective covering of surfaces, which has the unique element of having nonslip properties and excellent adherence, which is also a simple structure of one sole film.

Another objective of the invention is to enable said decorative and protective nonslip covering of multiple uses to also be soft to the touch, with a smooth appearance, simulating a woven fabric and which is easy to clean Another objective of the invention is to enable said decorative and protective nonslip covering of multiple uses to also be soft and avoid the movement of slippage of the utensils or objects placed thereupon Another objective of the invention is to make available said decorative and protective nonslip covering of multiple uses, which may also be installed on the surface to be covered with soft pressure without it sliding on the surface where it is applied.

Another objective of the invention is to enable said decorative and protective nonslip covering of multiple uses to also be homogenous on both surfaces and able to be cut to the size of the surface to be covered.

Yet another objective of this invention is to make available a new process for the manufacturing of nonslip decorative and protective covering, which is quick, simple, practical and economical All such qualities and objectives shall be made apparent upon performing a general and detailed description of this invention supported by the illustrated modalities.

BRIEF DESCRIPTION OF THE DRAWINGS

FIG. 1 shows a schematic diagram of the process for the manufacturing of a nonslip decorative and protective covering in accordance with this invention.

DETAILED DESCRIPTION OF THE PREFERRED EMBODIMENTS

In order to better understand the invention, a detailed description shall be made hereunder of some of the modalities thereof as shown in the drawings, which for illustrative but not limitative purposes are attached to this description The characteristic details of the manufacturing process of the nonslip decorative and protective covering of multiple uses, are clearly shown in the following description and the illustrative drawings attached hereto, with the reference numbers serving to specify the same parts.

Generally, the nonslip decorative and protective covering of multiple uses, in accordance with this invention, consists of a foamed cellular film based on dry mixed and calendared suspension resins, defining a smooth textured and decorated upper surface, and a rough lower surface with high adherence that avoids slippage on the surfaces where it is placed; said foamed film consists of the following composition:

a) Suspension resin of vinyl polychloride and/or copolymer of vinyl chloride.

b) Plasticizers in order to provide flexibility to the covering, of the group of phthalates (DOP, DINP, DOTP, DIDP, BBP, DEHP) and/or phosphates (TBP, TCP, DPCP) and/or benzoates (PGDB, DPGDB, DE/DPGDB) and/or some other mixture of plasticizers. Said plasticizers are added at an amount of between 10 and 100 parts per one hundred parts of resin c) Other components such as elastomers, Barium/Zinc or tin stabilizers; lubricants, biocides, flame retardants, pigments, charges and any other additive in order to facilitate the processing thereof.

d) Foaming agents such as azodicarbonamide and derivatives thereof, expandable hydrazines and/or microspheres of acrylic polymers, nitrile-acryl, styrene, PVDC, and with butane or pentane gas or another liquid. The amount may vary from between 1 and 10 parts per one hundred parts or resin.

The process for the production of nonslip decorative and protective coverings, in accordance with this invention, includes the following steps:

a) Feed and homogenize the components in an intensive high speed mixer until a dry mixture is obtained;

b) Feed the dry mixture into mixers until plasticized;

c) Form the decorative film in a 4 to 5-roller calendar;

d) Texture the obtained film with engraving rollers; and e) Print the textured film onto the upper surface with offset printing, serigraphy or rotogravure with different designs and colors.

In order to better understand the characteristics, the illustrative but not limitative drawings accompany this description as an integral part thereof, as described hereunder.

FIG. 1 shows a schematic diagram of the manufacturing process of a nonslip decorative and protective covering in accordance with this invention. Said FIGURE shows that the components are fed (see brief description of the figures) into a high speed intensive mixer 1 until a dry homogenized mixture is obtained, which is dosed towards some mixers 2 where the mixture is plasticized, which is fed by a pair of feeding rollers 3 to a calender of four to five rollers 4 in order to form the decorative film 5. Said film is passed through at least a pair of engraving rollers 6 that texture the film. Finally, said textured film is passed through a printing device 7 where the upper surface of the film is printed with offset printing, serigraphy or rotogravure in different designs and colors, which is finally rolled onto a reel 8. Said process results in a foamed cellular film based on dry mixed and calendared suspension resins, defining a smooth textured and decorated upper surface, and a rough lower surface with high adherence that avoids slippage on the surfaces where it is placed.

The invention has been sufficiently described in order for a person with average knowledge in the field to be able to reproduce and obtain the results we mention in this invention. However, any person with skills in the technical area who deals with this invention may be able to make modifications not described in this application; however, if for the application of such modifications in a determined structure or in the manufacturing process thereof, the material is required of the following claims, said structures should be included within the scope of the invention.

What is claimed is:

1. A nonslip decorative and protective covering of multiple uses, characterized in that the covering consists essentially of a unitary layer of resin comprising a foamed cellular film formed of dry mixed and calendared foamed suspension resin, wherein the calendaring process provides a smooth textured upper surface and a rough lower surface with high adherence, said smooth textured upper surface being decorated by printing.

2. The nonslip decorative and protective covering of multiple uses as claimed in claim 1, characterized in that the unitary layer of resin consists essentially of:

a) a suspension resin of vinyl polychloride and/or copolymer of vinyl chloride;

b) plasticizers in order to provide flexibility to the covering;

c) processing additives selected from the group consisting of: elastomers, Barium/Zinc or tin stabilizers; lubricants, biocides, flame retardants, pigments and charges; and d) a chemical foaming agent.

3. The nonslip decorative and protective covering of multiple uses as claimed in claim 2, characterized in that the plasticizers are selected from the group consisting of phthalates (DOP, DINP, DOTP, DIDP, BBP, DEHP), phosphates (TBP, TCP, DPCP) and/or benzoates (PGDB, DPGDB, DE/DPGDB) and mixtures thereof.

4. The nonslip decorative and protective covering of multiple uses as claimed in claim 3, characterized in that the plasticizers are added at an amount of between 10 and 100 parts per 100 parts of resin.

5. The nonslip decorative and protective covering of multiple uses as claimed in claim 2, characterized in that the chemical foaming agents are selected from the group consisting of azodicarbonamide and derivatives thereof, expandable hydrazines and microspheres of acrylic polymers, nitrile-acryl, styrene, PVDC, with butane or pentane gas or another liquid.

6. The nonslip decorative and protective covering of multiple uses as claimed in claim 5, characterized in that the concentration of the foaming agents vary from between 1 and 10 parts foaming agent per one hundred parts of resin.

7. A nonslip protective covering, the nonslip protective covering comprising:

a unitary resin layer, the unitary resin layer comprising a foamed cellular film comprising:

a suspension resin, the suspension resin comprising a resin selected from the group consisting of vinyl polychloride, copolymer of vinyl chloride and mixtures thereof;

a plasticizer; and a chemical foaming agent;

wherein the unitary resin layer is prepared by a calendaring process to provide a smooth textured first surface and a rough second surface, the second surface having high adherence.

8. The nonslip protective covering of claim 7, wherein the foamed cellular film further comprises at least one processing additive selected from the group consisting of elastomers, Barium/Zinc or tin stabilizers; lubricants, biocides, flame retardants, pigments and charges.

9. The nonslip protective covering of claim 7, wherein the plasticizer is selected from the group consisting of phthalates (DOP, DTNP, DOTP, DIDP, BBP, DEHP), phosphates (TBP, TCP, DPCP), benzoates (PGDB, DPGDB, DE/DPGDB) and mixtures thereof, and wherein the plasticizers are added at an amount of between 10 and 100 parts per 100 parts of resin.

10. The nonslip protective covering of claim 7, wherein the chemical foaming agent is selected from the group consisting of azodicarbonamide and derivatives thereof, expandable hydrazines, and microspheres of acrylic polymers, nitrile-acryl, styrene, PVDC, with butane, pentane gas or another liquid, and combinations thereof, and wherein the foaming agent is added in an amount between 1 and 10 parts of foaming agent per one hundred parts of resin.

* * * * *

UNITED STATES PATENT AND TRADEMARK OFFICE
CERTIFICATE OF CORRECTION

PATENT NO. : 8,691,363 B2  Page 1 of 1
APPLICATION NO. : 11/903055
DATED : April 8, 2014
INVENTOR(S) : Gabriel L. Montiel It is certified that error appears in the above-identified patent and that said Letters Patent is hereby corrected as shown below:

In the Claims

In Claim 9, Column 5, line 12 the claim language "(DOP, DTNP, DOTP, DIDP, BBP, DEHP)" should read -- (DOP, DINP, DOTP, DIDP, BBP, DEHP) --

Signed and Sealed this
Second Day of September, 2014

Michelle K. Lee
*Deputy Director of the United States Patent and Trademark Office*